(12) United States Patent
Honda

(10) Patent No.: US 10,703,142 B2
(45) Date of Patent: Jul. 7, 2020

(54) PNEUMATIC TIRE

(71) Applicant: BRIDGESTONE CORPORATION, Chuo-ku, Tokyo (JP)

(72) Inventor: Shingo Honda, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 14 days.

(21) Appl. No.: 15/517,965

(22) PCT Filed: Nov. 9, 2015

(86) PCT No.: PCT/JP2015/005589
§ 371 (c)(1),
(2) Date: Apr. 10, 2017

(87) PCT Pub. No.: WO2016/075922
PCT Pub. Date: May 19, 2016

(65) Prior Publication Data
US 2017/0297378 A1    Oct. 19, 2017

(30) Foreign Application Priority Data

Nov. 11, 2014 (JP) .................................. 2014-229087

(51) Int. Cl.
*B60C 11/12* (2006.01)
*B60C 11/00* (2006.01)
(Continued)

(52) U.S. Cl.
CPC .......... *B60C 11/0083* (2013.01); *B60C 11/00* (2013.01); *B60C 11/03* (2013.01);
(Continued)

(58) Field of Classification Search
CPC ............ B60C 11/1376; B60C 11/1384; B60C 11/1392; B60C 11/00; B60C 11/03;
(Continued)

(56) References Cited

U.S. PATENT DOCUMENTS

2014/0090759 A1    4/2014  Tanaka

FOREIGN PATENT DOCUMENTS

CN           103707722 A       4/2014
EP             2455234 A1       5/2012
(Continued)

OTHER PUBLICATIONS

Machine translation of JP2003-159910 (no date).*
(Continued)

*Primary Examiner* — Steven D Maki
*Assistant Examiner* — Philip N Schwartz
(74) *Attorney, Agent, or Firm* — Kenja IP Law PC

(57) ABSTRACT

The pneumatic tire of this disclosure comprises on a tread surface one or more land portions, wherein the land portions is formed into a protruding shape such that its tire radial outline in a tire widthwise cross section protrudes to a tire radial outer side, the outline includes, in the tire widthwise cross section, at least a first arcuate surface having a radius of curvature of a tire widthwise center of the land portion, and second arcuate surfaces having radiuses of curvature smaller than the first arcuate surface and located on both tire widthwise edges of the land portion, sipes extending in the tire width direction are formed on the land portions formed into the protruding shape, the sipes have chamfer portions, and the chamfer portions have chamfer widths on at least one of both tire widthwise edges larger than chamfer widths on the tire widthwise center.

5 Claims, 2 Drawing Sheets

(51) Int. Cl.
*B60C 11/03* (2006.01)
*B60C 11/13* (2006.01)
*B60C 11/04* (2006.01)

(52) U.S. Cl.
CPC ...... *B60C 11/0304* (2013.01); *B60C 11/0306* (2013.01); *B60C 11/04* (2013.01); *B60C 11/12* (2013.01); *B60C 11/1236* (2013.01); *B60C 11/1376* (2013.01); *B60C 11/1384* (2013.01); *B60C 2011/1209* (2013.01)

(58) Field of Classification Search
CPC . B60C 11/12; B60C 11/0083; B60C 11/0304; B60C 11/1236; B60C 11/0306; B60C 11/04; B60C 11/1281; B60C 2011/1281
See application file for complete search history.

(56) References Cited

FOREIGN PATENT DOCUMENTS

| | | | |
|---|---|---|---|
| EP | 2711200 A1 | 3/2014 | |
| JP | H0310910 A | 1/1991 | |
| JP | 2001287510 A | 10/2001 | |
| JP | 2003159910 A * | 6/2003 | ......... B60C 11/1384 |
| JP | 2011073471 A | 4/2011 | |
| JP | 2012111438 A | 6/2012 | |
| JP | 2012116410 A | 6/2012 | |
| WO | 2007028442 A1 | 3/2007 | |

OTHER PUBLICATIONS

Jan. 22, 2018, Search Result of Office Action issued by the State Intellectual Property Office in the corresponding Chinese Patent Application No. 201580061454.2.

* cited by examiner

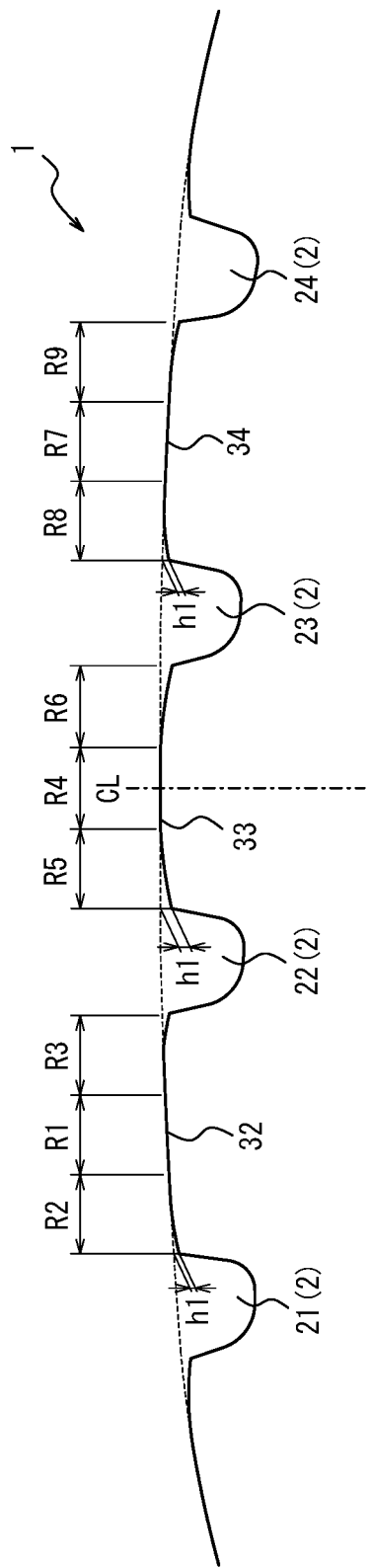

PNEUMATIC TIRE

TECHNICAL FIELD

This disclosure relates to a pneumatic tire.

BACKGROUND

Conventionally, in a pneumatic tire, in order to improve the WET properties (travelling performance on wet road surface), applied is a method of setting tire radial outlines of land portions partitioned by circumferential main grooves continuously extending in a tread circumferential direction to a protruding shape in the tire radial direction, etc. (see, e.g., PTL1).

CITATION LIST

Patent Literature

PTL1 JP2012-116410A

SUMMARY

Technical Problem

Recently, as an indicator of safety when WET, improvement in WET braking performance is particularly required. The WET braking performance can be improved by disposing grooves on land portions, while grooves become the reason of noise occurrence due to an air path between the tire and the road surface, and thus causes deterioration of silence. In the case of forming sipes instead of grooves, although the deterioration of silence can be suppressed, there are cases that the WET braking performance cannot be improved sufficiently. Therefore, desired is a method for maintaining the silence at a high level even when the WET braking performance is improved.

This disclosure is to solve such problem, and is to provide a pneumatic tire capable of improving the WET braking performance, and simultaneously maintaining the silence at a high level.

Solution to Problem

The subject of this disclosure is as follows.

The pneumatic tire of this disclosure comprises on a tread surface one or more land portions sandwiched by a plurality of circumferential main grooves continuously extending in a tire circumferential direction, wherein at least one of the land portions is formed into a protruding shape such that its tire radial outline in a tire widthwise cross section protrudes to a tire radial outer side, the outline includes, in the tire widthwise cross section, at least a first arcuate surface having a radius of curvature of a tire widthwise center of the land portion, and second arcuate surfaces having radiuses of curvature smaller than the first arcuate surface and located on both tire widthwise edges of the land portion, sipes extending in the tire width direction are formed on the at least one of the land portions formed into the protruding shape, the sipes have chamfer portions on tread surface opening positions, and the chamfer portions have chamfer widths on at least one of both tire widthwise edges larger than chamfer widths on the tire widthwise center.

Here, the "surface of the tread" refers to the outer circumferential surface, around the whole circumference of the tire, that contacts with the road surface when the tire is rotated after mounting on an applicable rim with specified air pressure and a load corresponding to the maximum load capability applied. Here, the "applicable rim" refers to a standard rim specified by the standards below in accordance with tire size (the "Design Rim" in the YEAR BOOK of TRA below, and the "Measuring Rim" in the STANDARDS MANUAL of ETRTO below). The "prescribed internal pressure" refers to an air pressure specified by the standards below in accordance with the maximum load capability. The "maximum load capability" refers to the maximum mass that the tire is allowed to bear according to the standards below. The standards are determined by valid industrial standards for the region in which the tire is produced or used, such as the "Year Book" of "the Tire and Rim Association, Inc. (TRA)" in the United States of America, the "Standards Manual" of "the European Tyre and Rim Technical Organization (ETRTO)" in Europe, and the "JATMA Year Book" of the Japan Automobile Tire Manufacturers Association (JATMA) in Japan.

The "sipe" refers to a thin cut from the surface to the inside of the land portion, of which at least a part of wall surfaces of the sipe contact each other in a contacting state at contacting conditions that the pneumatic tire is mounted to an applicable rim, applied with a prescribed internal pressure and applied with an air pressure corresponding to a maximum load capability.

"Extending in a tread widthwise direction" refers to not extending exactly in the tread widthwise direction, but extending in a direction having a tire widthwise component.

The circumferential main groove "continuously extending in a tread circumferential direction" refers to continuously extending toward the tread circumferential direction, which is inclusive of the state of continuously extending in a zigzag shape toward the tread circumferential direction, and continuously extending in a curved shape toward the tread circumferential direction.

The "chamfer width" and/or the "chamfer part width" refers to a dimension of a chamfer portion and/or a chamfer part in a direction orthogonal to an extension direction of the sipe at any position of the sipe, in the contacting state at the contacting conditions that the pneumatic tire is mounted to an applicable rim, applied with a prescribed internal pressure and applied with an air pressure corresponding to a maximum load capability.

Further, the definition that "the chamfer portions have chamfer widths on at least one tire widthwise edge larger than chamfer widths of chamfer portions on the tire widthwise center" is inclusive of the situation that merely the edge area has chamfer portions, and the central area does not have chamfer portions.

Advantageous Effect

According to this disclosure, it is possible to provide a pneumatic tire capable of improving the WET braking performance, and simultaneously maintaining the silence at a high level.

BRIEF DESCRIPTION OF THE DRAWINGS

FIG. 2 is a partial cross-sectional view in the tire width direction of the pneumatic tire, for illustrating the outline of the tread of the pneumatic tire according to an embodiment of this disclosure according to FIG. 1.

DETAILED DESCRIPTION

Figure 1:
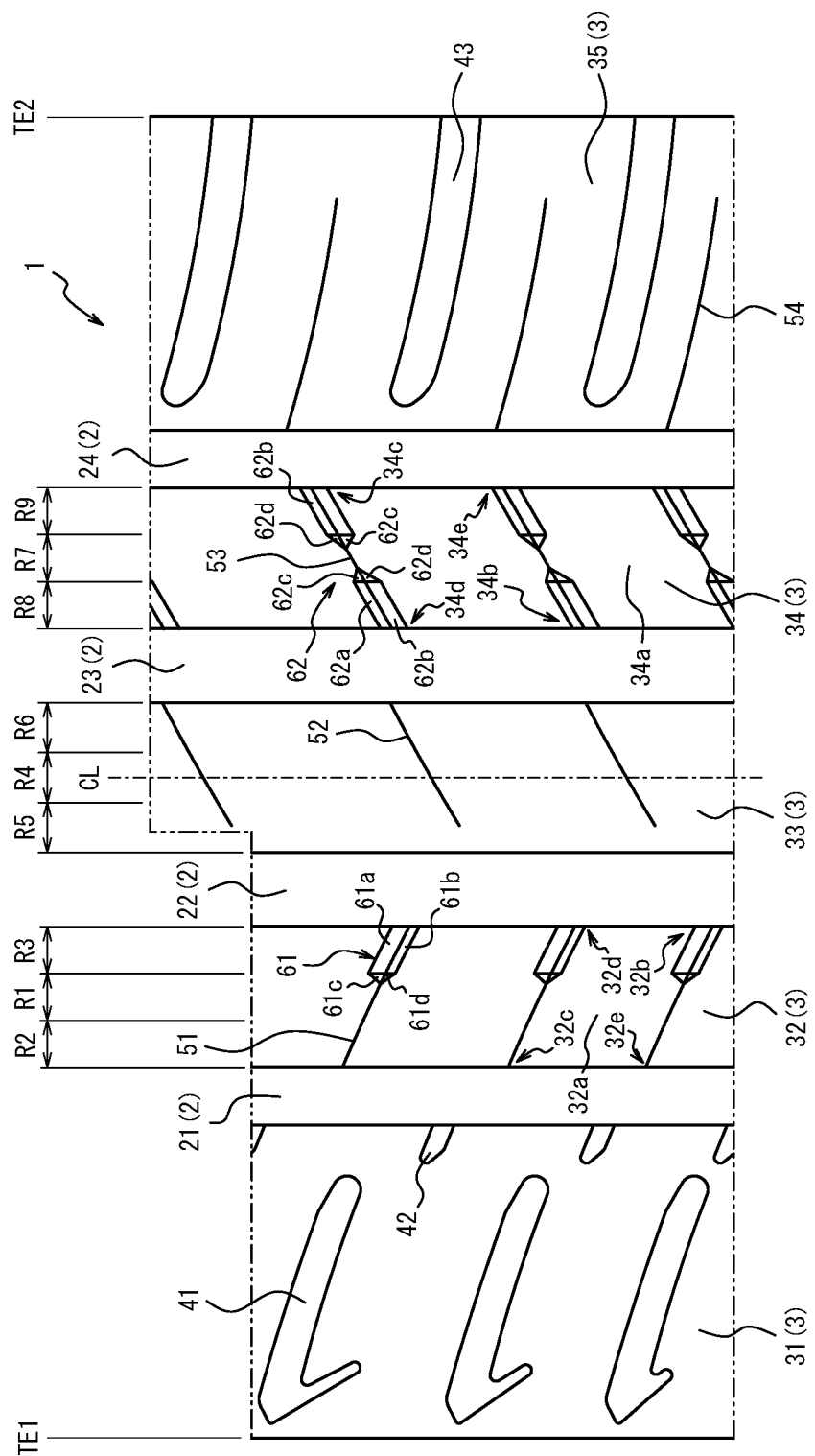
FIG. 1 is a development view illustrating a tread pattern of a pneumatic tire according to an embodiment of this disclosure.

Hereinafter, an embodiment of this disclosure will be described with reference to the drawings.

FIG. 1 a development view illustrating a tread pattern of a pneumatic tire (hereinafter referred to as merely the tire) according to an embodiment of this disclosure, which illustrates the tread surface developed at an unloaded condition, when the tire is mounted to an applicable rim and is applied with a prescribed internal pressure.

As illustrated in FIG. 1, the tire according to an embodiment of this disclosure has on a tread surface 1 circumferential main grooves 2 formed in a manner continuously extending in the tread circumferential direction. The example of FIG. 1 has four circumferential main grooves 21, 22, 23, 24. These circumferential main grooves 2 are capable of ensuring the drainage performance of the tire. In the example as illustrated in FIG. 1, the four circumferential main grooves 2 are disposed symmetrically with respect to a tire equatorial plain CL, respectively two on each tread widthwise half portion partitioned by the tire equatorial plain CL.

As illustrated in FIG. 1, a plurality of land portions 3 are partitioned by these four circumferential main grooves 2 and tread edges TE1, TE2. Specifically, an outermost land portion 31 on one tire widthwise side is partitioned by an outermost circumferential main groove 21 on one tire widthwise side and a tread edge TE1 on the one side, an intermediate land portion 32 on the one side is partitioned by the outermost circumferential main groove 21 and a circumferential main groove 22 disposed adjacent to the other tire widthwise side of the outermost circumferential main groove 21, a central land portion 33 located on the tire equatorial plain CL in the illustrated example is partitioned by the circumferential main groove 22 and a circumferential main groove 23 disposed adjacent to the other tire widthwise side of the circumferential main groove 22, an intermediate land portion 34 on the other tire widthwise side is partitioned by the circumferential main groove 23 and an outermost circumferential main groove 24 on the other tire widthwise side, and an outermost land portion 35 on the other tire widthwise side is partitioned by the outermost circumferential main groove 24 on the other tire widthwise side and a tread edge TE2 on the other side. Here, the "tread edge" in the present Specification refers to a tire widthwise outermost position of the aforementioned "tread surface". The tire of the present embodiment is mounted in a manner such that the tread edge TE2 is on the vehicle inner side.

The outermost circumferential main grooves 21 and 24 of the present embodiment have groove widths of 9.3 mm and groove depths of 8.0 mm, and the circumferential main grooves 22 and 23 have groove widths of 12.9 mm and groove depths of 8.4 mm. Moreover, in the illustrated example, the outermost land portion 31 and the outermost land portion 35 are formed so as to have equal tire widthwise dimensions. Moreover, the intermediate land portion 32 and the intermediate land portion 34 are formed so as to have equal tire widthwise dimensions.

On the outermost land portion 31 of the present embodiment, formed are first lug grooves 41 of which both ends end within the outermost land portion 31, and second lug grooves 42 of which one end opens to the circumferential main groove 21 and the other end ends within the outermost land portion 31.

FIG. 2 is a partial cross-sectional view in the tire width direction of the pneumatic tire, for illustrating the outline of the tread of the pneumatic tire according to an embodiment of this disclosure according to FIG. 1. Here, illustrated in FIG. 2 is a land portion in which lug grooves and sipes are not formed, or lug grooves and sipes are omitted. As illustrated in FIG. 2, the intermediate land portions 32, 34 and the central land portion 33 are formed into the protruding shapes such that their tire radial outlines in the tire widthwise cross section protrude to a tire radial outer side. The intermediate land portions 32, 34 and the central land portion 33 of the present embodiment are formed with tire radial dimensions (width difference) h1 of, e.g., 1 mm, between apexes of the outlines of the land portions formed into the protruding shapes in the tire widthwise cross sections of the intermediate land portions 32, 34 and the central land portion 33 and both tire widthwise edges of the intermediate land portions 32, 34 and the central land portion 33.

In the tire widthwise cross section of the intermediate land portion 32, the outline of the intermediate land portion 32 of the present embodiment includes a first arcuate surface R1 having a radius of curvature of the tire widthwise center of the intermediate land portion 32, and second arcuate surfaces R2 and R3 having radiuses of curvature smaller than the first arcuate surface R1 and located on both tread widthwise edges of the intermediate land portion 32. In particular, in the present embodiment, when the outline of the intermediate land portion 32 is trisected in the tire width direction, a central area inclusive of the tire widthwise center is formed as the first arcuate surface R1, of which the entire outline has the same radius of curvature. Moreover, in the present embodiment, the areas on both edges of the central area are formed as the second arcuate surfaces R2 and R3, of which the entire outlines have the same radiuses of curvature. Here, in the present embodiment, the borderlines of each area and the borderlines of the arcuate surfaces are in accordance, while the borderlines of each area and the borderlines of the arcuate surfaces may be not in accordance as well.

On the intermediate land portion 32 of the present embodiment, sipes 51 extending in the tread widthwise direction are formed. The sipes 51 of the present embodiment have one end opening to the circumferential main groove 21, and the other end opening to the circumferential main groove 22. Moreover, the intermediate land portion 32 of the present embodiment does not have grooves formed thereon. Therefore, the intermediate land portion 32 of the present embodiment is formed into a block-like shape via merely the sipes 51. The sipe widths of the sipes 51 of the present embodiment are 0.5 mm.

As illustrated in FIG. 1, the sipes 51 of the present embodiment extend in a manner inclined with respect to the tire width direction. The sipes 51 may, for example, extend in a manner inclined at 10° to 60° with respect to the tire width direction. If the sipes 51 extend in a manner inclined with respect to the tire width direction, the extension lengths of the sipes 51 can be increased, and thus it is possible to improve the edge effect obtained in the land portions, and to further improve the WET braking performance. The sipes 51 of the present embodiment extend in a manner inclined at approximately 30° with respect to the tire width direction. Therefore, in the present embodiment, each block 32a for forming the intermediate land portion 32 is formed into approximately a parallelogram, via a pair of sides extending in the tread circumferential direction partitioned by the circumferential main grooves 21 and 22, and a pair of sides partitioned by the sipes 51. Namely, the blocks 32a of the present embodiment have corner portions 32*b* and 32*c* in which angles of the sipes 51 to the circumferential main grooves 21, 22 are acute angles (hereinafter referred to as "acute angle corner portions" as well), and corner portions 32*d* and 32*e* in which the same are obtuse angles (hereinafter referred to as "obtuse angle corner portions" as well).

The sipes 51 of the present embodiment have chamfer portions 61 at tread surface opening positions. The sipes 51 of the present embodiment have chamfer portions 61 on merely the side closer to the circumferential main groove 22 than the tire widthwise center of the intermediate land portion 32. The chamfer portions 61 of the present embodiment are formed of chamfer parts 61*a*, 61*b*, 61*c* and 61*d*.

The chamfer parts 61*a* of the present embodiment are formed on the second arcuate surface R3 of the outline of the intermediate land portion 32, which is inclusive of the acute angle corner portions 32*b* on the circumferential main groove 22 sides of the blocks 32*a*, and have chamfer part widths of 1 to 5 times, preferably 3 to 5 times to the widths of the sipes 51. The chamfer parts 61*a* of the present embodiment have chamfer part widths of, e.g., 2.5 mm.

The chamfer parts 61*b* of the present embodiment are formed on the second arcuate surface R3 on the outline of the intermediate land portion 32, which is inclusive of the obtuse angle corner portions 32*d* on the circumferential main groove 22 sides of the blocks 32*a* adjacent to the blocks 32*a* on which the chamfer parts 61*a* are formed, and have chamfer part widths of 1 to 5 times, preferably 3 to 5 times to the widths of the sipes 51. In the present embodiment, the chamfer parts 61*a* and 61*b* are formed in a manner such that the chamfer part widths of the chamfer parts 61*a* in the corner portions 32*b* are larger than the chamfer part widths of the chamfer parts 61*b* in the corner portions 32*d*. The chamfer parts 61*b* of the present embodiment have chamfer part widths of, e.g., 1.5 mm.

Moreover, the chamfer parts 61*a* and 61*b* of the present embodiment are formed in a manner such that their chamfer heights, i.e., their tire radial dimensions, are constant in the extension direction of the sipes 51, and are constant among the chamfer parts 61*a* and among the chamfer parts 61*b*. Moreover, in the present embodiment, the chamfer parts 61*a* and 61*b* are formed in a manner such that the tire radial dimensions of the chamfer portions 61 in the tire widthwise cross section are larger than the tire radial dimensions (width difference) hl between the apex of the outline of the intermediate land portion 32 formed into the protruding shape in the tire widthwise cross section and both tire widthwise edges of the intermediate land portion 32. The chamfer heights of the chamfer parts 61*a* and 61*b* of the present embodiment are, e.g., 1.5 mm.

The chamfer parts 61*c* of the present embodiment are formed adjacent to the chamfer parts 61*a*, on the first arcuate surface R1 of the central area of the outline of the intermediate land portion 32. Moreover, the chamfer parts 61*d* of the present embodiment are formed adjacent to the chamfer parts 61*b*, on the first arcuate surface R1 of the central area of the outline of the intermediate land portion 32. The chamfer parts 61*c* and 61*d* of the present embodiment are formed in a manner such that the chamfer part widths are gradually reduced toward the tire widthwise center of the intermediate land portion 32. Therefore, they are formed in a manner such that the chamfer widths on at least one (the second arcuate surface R3 side) of both tire widthwise edges are larger than the chamfer widths on the tire widthwise center.

Moreover, the chamfer parts 61*c* and 61*d* of the present embodiment are formed in a manner such that their chamfer heights, i.e., their tire radial dimensions, are constant. In the present embodiment, the chamfer parts 61*a* and 61*b* are formed so as to have the same chamfer heights (1.5 mm). In the present embodiment, the chamfer parts 61*c* and 61*d* are formed in a manner such that the chamfer part widths of the chamfer parts 61*c* are larger than the chamfer part widths of the chamfer parts 61*d*.

In the present embodiment, the chamfer parts 61*c* and 61*d* are formed in a manner such that the first arcuate surface R1 of the central area has a chamfer part nonformation area without chamfer parts 61*c* and 61*d* formed thereon.

Similarly as the intermediate land portion 32, in the tire widthwise cross section of the central land portion 33, the outline of the central land portion 33 of the present embodiment includes a first arcuate surface R4 having a radius of curvature of the tire widthwise center of the central land portion 33, and second arcuate surfaces R5 and R6 having radiuses of curvature smaller than the first arcuate surface R4 and located on both tire widthwise edges of the central land portion 33. In particular, in the present embodiment, when the outline of the central land portion 33 is trisected in the tire width direction, a central area inclusive of the tire widthwise center is formed as the first arcuate surface R4, of which the entire outline has the same radius of curvature. Moreover, in the present embodiment, the areas on both edges of the central area are formed as the second arcuate surfaces R5 and R6, of which the entire outlines have the same radiuses of curvature. Here, in the present embodiment, the borderlines of each area and the borderlines of the arcuate surfaces are in accordance, while the borderlines of each area and the borderlines of the arcuate surfaces may be not in accordance as well.

On the central land portion 33 of the present embodiment, sipes 52 extending in a manner inclined with respect to the tire widthwise direction are formed. The sipes 52 of the present embodiment have one end opening to the circumferential main groove 23, and the other end ending within the central land portion 33. The sipe widths of the sipes 52 of the present embodiment are, e.g., 0.5 mm.

In the tire widthwise cross section of the intermediate land portion 34, the outline of the intermediate land portion 34 of the present embodiment includes a first arcuate surface R7 having a radius of curvature of the tire widthwise center of the intermediate land portion 34, and second arcuate surfaces R8 and R9 having radiuses of curvature smaller than the first arcuate surface R7 and located on both tire widthwise edges of the intermediate land portion 34. In particular, in the present embodiment, when the outline of the intermediate land portion 34 is trisected in the tire width direction, a central area inclusive of the tire widthwise center is formed as the first arcuate surface R7, of which the entire outline has the same radius of curvature. Moreover, in the present embodiment, the areas on both edges of the central area are formed as the second arcuate surfaces R8 and R9, of which the entire outlines have the same radiuses of curvature. Here, in the present embodiment, the borderlines of each area and the borderlines of the arcuate surfaces are in accordance, while the borderlines of each area and the borderlines of the arcuate surfaces may be not in accordance as well.

On the intermediate land portion 34 of the present embodiment, sipes 53 extending in the tire widthwise direction are formed. The sipes 53 of the present embodiment have one end opening to the circumferential main groove 23, and the other end opening to the circumferential main groove 24. Moreover, the intermediate land portion 34 of the present embodiment does not have grooves formed thereon.

Therefore, the intermediate land portion 34 of the present embodiment is formed into a block-like shape via merely the sipes 53. The sipe widths of the sipes 53 of the present embodiment are, e.g., 0.5 mm.

As illustrated in FIG. 1, the sipes 53 of the present embodiment extend in a manner inclined with respect to the tire width direction. The sipes 53 may, for example, extend in a manner inclined at 10° to 60° with respect to the tire width direction. If the sipes 53 extend in a manner inclined with respect to the tire width direction, the extension lengths of the sipes 53 can be increased, and thus it is possible to improve the edge effect obtained in the land portions, and to further improve the WET braking performance. The sipes 53 of the present embodiment extend in a manner inclined at approximately 30° with respect to the tire width direction. Therefore, in the present embodiment, each block 34a for forming the intermediate land portion 34 is formed into approximately a parallelogram, via a pair of sides extending in the tread circumferential direction partitioned by the circumferential main grooves 23 and 24, and a pair of sides partitioned by the sipes 53. Namely, the blocks 34a of the present embodiment have corner portions 34b and 34c in which angles of the sipes 51 to the circumferential main grooves 23, 24 are acute angles (hereinafter referred to as "acute angle corner portions" as well), and corner portions 34d and 34e in which the same are obtuse angles (hereinafter referred to as "obtuse angle corner portions" as well).

The sipes 53 of the present embodiment have chamfer portions 62 at tread surface opening positions. The chamfer portions 62 of the present embodiment are formed of chamfer parts 62a, 62b, 62c and 62d.

The chamfer parts 62a of the present embodiment are formed on the second arcuate surfaces R8 and R9 of the outline of the intermediate land portion 34, which is inclusive of the acute angle corner portions 34b and 34c of the blocks 34a, and have chamfer part widths of 1 to 5 times, preferably 3 to 5 times to the widths of the sipes 53. The chamfer parts 62a of the present embodiment have chamfer part widths of, e.g., 2.5 mm.

The chamfer parts 62b of the present embodiment are formed on the second arcuate surfaces R8 and R9 of the outline of the intermediate land portion 34, which is inclusive of the obtuse angle corner portions 34d and 34e of the blocks 34a adjacent to the blocks 34a on which the chamfer parts 62a are formed, and have chamfer part widths of 1 to 5 times, preferably 3 to 5 times to the widths of the sipes 53. In the present embodiment, the chamfer parts 62a and 62b are formed in a manner such that the chamfer part widths of the chamfer parts 62a in the corner portions 34b and 34c are larger than the chamfer part widths of the chamfer parts 62b in the corner portions 34d and 34e. The chamfer parts 62b of the present embodiment have chamfer part widths of, e.g., 1.5 mm.

Moreover, the chamfer parts 62a and 62b of the present embodiment are formed in a manner such that their chamfer heights, i.e., their tire radial dimensions, are constant in the extension direction of the sipes 53, and are constant among the chamfer parts 62a and among the chamfer parts 62b. Moreover, in the present embodiment, the chamfer parts 62a and 62b are formed in a manner such that the tire radial dimensions of the chamfer portions 62 in the tire widthwise cross section are larger than the tire radial dimensions (width difference) h1 between the apex of the outline of the intermediate land portion 34 formed into the protruding shape in the tire widthwise cross section and both tire widthwise edges of the intermediate land portion 34. The chamfer heights of the chamfer parts 62a and 62b of the present embodiment are, e.g., 1.5 mm.

The chamfer parts 62c of the present embodiment are formed adjacent to two chamfer parts 62a, on the first arcuate surface R7 of the central area of the outline of the intermediate land portion 34. Moreover, the chamfer parts 62d of the present embodiment are formed adjacent to two chamfer parts 62b, on the first arcuate surface R7 of the central area of the outline of the intermediate land portion 34. The chamfer parts 62c and 62d of the present embodiment are formed in a manner such that the chamfer part widths are gradually reduced toward the tire widthwise center of the intermediate land portion 34. Therefore, they are formed in a manner such that the chamfer widths on both the tire widthwise edges (both edges of the second arcuate surfaces R8 and R9) are larger than the chamfer widths on the tire widthwise center.

Moreover, the chamfer parts 62c and 62d of the present embodiment are formed in a manner such that their chamfer heights, i.e., their tire radial dimensions, are constant. In the present embodiment, the chamfer parts 62a and 62b are formed so as to have the same chamfer heights (1.5 mm). In the present embodiment, the chamfer parts 62c and 62d are formed in a manner such that the chamfer part widths of the chamfer parts 62c are larger than the chamfer part widths of the chamfer parts 62d.

In the present embodiment, the chamfer parts 62c and 62d are formed in a manner such that the first arcuate surface R7 of the central area has a chamfer part nonformation area without chamfer parts 62c and 62d formed thereon.

On the outermost land portion 35 of the present embodiment, formed are third lug grooves 43 of which one end opens to the tread edge TE2 and the other end ends within the outermost land portion 35. On the outermost land portion 35 of the present embodiment, further formed are sipes 54 of which one end opens to the circumferential main groove 24 and the other end ends within the outermost land portion 35.

In this way, the tire according to an embodiment of this disclosure comprises on a tread surface 1 an intermediate land portion 32, a central land portion 33 and an intermediate land portion 34 sandwiched by a plurality of circumferential main grooves 2 continuously extending in a tire circumferential direction, wherein the intermediate land portion 32, the central land portion 33 and the intermediate land portion 34 are formed into the protruding shape such that their tire radial outlines in a tire widthwise cross section protrude to a tire radial outer side, the outlines include, in the tire widthwise cross section, at least first arcuate surfaces R1, R4 and R7 having radiuses of curvature of a tire widthwise center of the intermediate land portion 32, the central land portion 33 and the intermediate land portion 34, and second arcuate surfaces R2, R5, R8 and R3, R6, R9 having radiuses of curvature smaller than the first arcuate surfaces R1, R4 and R7 and located on both tire widthwise edges of the intermediate land portion 32, the central land portion 33 and the intermediate land portion 34, sipes 51 and 53 extending in the tire width direction are formed on the intermediate land portion 32 and the intermediate land portion 34 among the intermediate land portion 32, the central land portion 33 and the intermediate land portion 34 formed into the protruding shapes, the sipes 51 and 53 have chamfer portions 61 and 62 on tread surface opening positions, and the chamfer portions 61 and 62 have chamfer widths on at least one of both tire widthwise edges larger than chamfer widths on the tire widthwise center.

The effect of the tire according to present embodiment is described in the following.

The WET braking performance can be improved by disposing grooves on land portions, while grooves become air paths between the tire and the road surface and thus causes noise, which leads to deterioration of silence. In the case of forming sipes instead of grooves, although the deterioration of silence can be suppressed, there are cases that the WET braking performance cannot be improved sufficiently.

Regarding this, according to the tire of an embodiment of this disclosure, first, by setting the intermediate land portion 32, the central land portion 33 and the intermediate land portion 34 to the protruding shapes, the ground contact pressure in the vicinity of the centers of the intermediate land portion 32, the central land portion 33 and the intermediate land portion 34 is increased, water film is cut and the tire becomes likely to contact the road surface, and simultaneously, the water in the vicinity of the tread surface 1 becomes likely to flow to the outer side of the intermediate land portion 32, the central land portion 33 and the intermediate land portion 34, which enables improving the WET braking performance. Moreover, since drainage effect is improved by disposing the chamfer portions 61 and 62 on the sipes 51 and 53, the volume of the space for forming paths of fluid such as grooves, which becomes the reason of noise, would not be increased, and the silence would not be deteriorated similarly as when grooves are disposed. Further, by disposing the chamfer portions 61 and 62, the edge component when braking is doubled, the water film can be further cut, and thus it is possible to further improve the WET braking performance. Furthermore, since the chamfer portions 61 and 62 have chamfer widths on at least one of both tire widthwise edges larger than chamfer widths on the tire widthwise center, the ground contact pressure in the vicinity of the centers of the intermediate land portions 32 and 34, which is increased by setting the protruding shapes, would not be reduced.

Therefore, according to the pneumatic tire of the present embodiment, it is possible to improve the WET braking performance, and simultaneously maintain the silence at a high level.

Here, in the tire of an embodiment of this disclosure, the sipe 51 and 53 preferably extend in a manner inclined with respect to the tire width direction. According to this configuration, as compared to the case that the sipes 51 and 53 do not extend in a manner inclined with respect to the tire width direction, the extension lengths of the sipes 51 and 53 can be increased. Therefore, the edge effect obtained in the intermediate land portions 32 and 34 is increased, and it is possible to further improve the WET braking performance.

In the tire of an embodiment of this disclosure, the chamfer widths of the chamfer portions 61 and 62 are preferably gradually reduced from both tire widthwise edges to the tire widthwise center. According to this configuration, the rigidity of the intermediate land portions 32 and 34 do not change rapidly, and thus it is possible to suppress generation of uneven wear.

In the tire of an embodiment of this disclosure, as mentioned above, it is preferable that the intermediate land portions 32 and 34 are formed into block-like shapes by the sipes 51 and 53 extending in a manner inclined with respect to the tire width direction, and among the corner portions of each block 32a and 34a of the intermediate land portions 32 and 34, the chamfer part widths of the corner portions 32b, 34b and 34c, of which the angles of the sipes 51 and 53 to the circumferential main grooves 22, 23 and 24 are acute angles, are larger than the chamfer part widths of the corner portions 32d, 34d and 34e, of which the angles of the sipes 51 and 53 to the circumferential main grooves 22, 23 and 24 are obtuse angles.

According this configuration, by comparatively increasing the chamfer part widths of the corner portions 32b, 34b and 34c, which are acute angles, it is possible to avoid large forces exerted to the acute angle corner portions 32b, 34b and 34c, and block lack, etc. occurring in the acute angle corner portions 32b, 34b and 34c. Moreover, even the chamfer part widths of the corner portions 32b, 34b and 34c, which are acute angles, are increased, by reducing the chamfer part widths of the corner portions 32d, 34d and 34e, which are obtuse angles, it is possible to suppress the increase of the chamfer amount of the entire chamfer portions, which is the reason of noise, and to thereby maintain the silence.

In the tire of an embodiment of this disclosure, as mentioned above, the tire radial dimensions of the chamfer portions 61 and 62 in the tire widthwise cross section are preferably larger than the tire radial dimensions between the apexes of the outlines of the land portions formed into the protruding shapes in the tire widthwise cross section and both tire widthwise edges of the land portions.

According to this configuration, sufficient space is ensured for draining water to the outside of the tire tread surface, and thus it is possible to further improve the WET braking performance.

In this disclosure, the chamfer parts 62c and 62d are preferably formed in a manner such that the arcuate surface of the central area has a chamfer part nonformation area without chamfer parts 62c and 62d formed thereon.

According to this configuration, it is possible to set the WET braking performance and the steering stability to a high level.

In this disclosure, the chamfer parts 61a and 61b preferably have constant chamfer heights, which are tire radial dimensions, in the extension directions of the sipes.

According to this configuration, it is possible to maintain the WET braking performance until the chamfer portion is worn to some degree.

A preferable embodiment of this disclosure has been described above, while this disclosure is not limited to the aforementioned embodiment. For example, 3 or 5 or more circumferential main grooves may be formed on the tread surface. Moreover, the outlines of each land portion may be formed of 4 or more areas. Further, the sipe with chamfer portions formed thereon may have merely one end opening to a circumferential groove, or have both ends ending within a land portion. Further, the central areas of each land portion may have totally no chamfer portions formed thereon. Other modifications or variations may be used as well.

TABLE 1

| | Example 1 | Example 2 | Example 3 | Example 4 | Example 5 | Comparative Example 1 | Comparative Example 2 | Comparative Example 3 |
|---|---|---|---|---|---|---|---|---|
| Sipe/groove | Inclined sipe | Inclined sipe | Inclined sipe | Inclined sipe | Uninclined sipe | Groove | Inclined sipe | Inclined sipe |
| Chamfer portion of edge area | Presence | Presence | Presence | Presence | Presence | — | Presence | Absence |

TABLE 1-continued

| | Example 1 | Example 2 | Example 3 | Example 4 | Example 5 | Comparative Example 1 | Comparative Example 2 | Comparative Example 3 |
|---|---|---|---|---|---|---|---|---|
| Chamfer portion of central area | Presence | Presence | Presence | Absence | Absence | — | Presence | Absence |
| Edge area chamfer width > central area chamfer width | TRUE | TRUE | TRUE | TRUE | TRUE | — | FALSE | — |
| Acute angular portion chamfer width > obtuse angular portion chamfer width | TRUE | TRUE | FALSE | FALSE | — | — | TRUE | — |
| Chamfer height > width difference | TRUE | FALSE | FALSE | FALSE | FALSE | — | FALSE | — |
| WET braking performance | 103 | 102 | 102 | 103 | 102 | 100 | 100 | 98 |
| Silence | 102 | 102 | 101 | 101 | 101 | 100 | 100 | 102 |
| Uneven wear resistance | 100 | 100 | 100 | 98 | 98 | 100 | 100 | 100 |

INDUSTRIAL APPLICABILITY

According to this disclosure, it is possible to provide a pneumatic tire capable of improving the WET braking performance, and simultaneously maintaining the silence at a high level.

REFERENCE SIGNS LIST 1 tread surface
2 circumferential main groove
21 outermost circumferential main groove
22, 23 circumferential main groove
24 outermost circumferential main groove
3 land portion
31 outermost central land portion
32 intermediate land portion
32a block
32b, 32c, 32d, 32e corner portion
33 central land portion
34 intermediate land portion
34a block
34b, 34c, 34d, 34e corner portion
35 outermost land portion
41 first lug groove
42 second lug groove
43 third lug groove
51, 52, 53, 54 sipe
61 chamfer portion
61a, 61b, 61c, 61d chamfer part
62 chamfer portion
62a, 62b, 62c, 62d chamfer part
CL tire equatorial plain
TE1, TE2 tread edge

The invention claimed is:

1. A pneumatic tire, comprising:
a land portion on a tread surface, the land portion sandwiched by a plurality of circumferential main grooves, the circumferential main grooves extending in a tire circumferential direction, wherein
the land portion is formed such that its tire radial outline protrudes in a protruding shape to a tire radial outer side,
the tire radial outline includes, in a tire widthwise cross section, a first arcuate surface having a radius of curvature of a tire widthwise center of the land portion, and second arcuate surfaces having radiuses of curvature smaller than the radius of curvature of the first arcuate surface, the second arcuate surfaces located on widthwise edges of the land portion;
sipes formed on the land portion and extending linearly in an inclined manner with respect to the tire width direction such that the land portion is formed into block-like shapes by the sipes;
the sipes having chamfer portions on land portion widthwise edges wherein the chamfer portions open to the tread surface, and
wherein the chamfer portions extend above and below the sipes in the tire circumferential direction forming a first corner portion having an acute angle along the land portion widthwise edge and a second corner portion having an obtuse angle along the land portion widthwise edge, and wherein the chamfer portions have gradually reduced chamfer portions widths as the chamfer portions extend towards the tire widthwise center;
the chamfer widths of the chamfer portions above and below the sipes are gradually reduced from the land portion widthwise edges to a land portion widthwise center, and wherein
a width of the corner portion having the acute angle along the land portion widthwise edge is larger than a width of the opposite corner portion having the obtuse angle along the land portion widthwise edge.

2. The pneumatic tire according to claim 1, wherein[M] tire radial dimensions of the chamfer portions in the tire widthwise cross section are larger than tire radial dimensions between an apex of the outline of the tire radial land portion formed into the protruding shape and widthwise edges of the land portion.

3. The pneumatic tire according to claim 1, wherein the land portion has an intermediate land portion formed into an approximate parallelogram shape via sides of adjacent circumferential main grooves and a pair of sides partitioned by the sipes.

4. The pneumatic tire according to claim 1, wherein, in a widthwise direction of the land portion, approximately one widthwise half of the land portion does not have chamfer portions.

5. The pneumatic tire according to claim 1, wherein each of the sipes has a first end opening to one of the plurality of circumferential main grooves and a second end opening to an outermost circumferential main groove.

* * * * *